US012681571B2

(12) United States Patent
Mulliken et al.

(10) Patent No.: US 12,681,571 B2
(45) Date of Patent: *Jul. 14, 2026

(54) EYE-GAZE BASED BIOFEEDBACK

(71) Applicant: Apple Inc., Cupertino, CA (US)

(72) Inventors: Grant H. Mulliken, Los Gatos, CA
(US); Christine Godwin, Sunnyvale,
CA (US); Izzet B. Yildiz, Sunnyvale,
CA (US); Sterling R. Crispin, Santa
Cruz, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/074,854

(22) Filed: Mar. 10, 2025

(65) Prior Publication Data

US 2025/0208704 A1 Jun. 26, 2025

Related U.S. Application Data

(63) Continuation of application No. 18/072,796, filed on
Dec. 1, 2022, now Pat. No. 12,277,265, which is a
(Continued)

(51) Int. Cl.
*G06F 3/01* (2006.01)
*G06T 19/00* (2011.01)
(52) U.S. Cl.
CPC .............. *G06F 3/013* (2013.01); *G06F 3/015*
(2013.01); *G06T 19/006* (2013.01)
(58) Field of Classification Search
CPC ........ G16H 50/20; G16H 15/00; G16H 50/30;
A61B 2/085; A61B 5/168; A61B 5/163;
(Continued)

(56) References Cited

U.S. PATENT DOCUMENTS

| | | | |
|---|---|---|---|
| 5,137,027 | A | 8/1992 | Rosenfeld |
| 7,429,108 | B2 | 9/2008 | Rosenberg |

(Continued)

FOREIGN PATENT DOCUMENTS

| | | | |
|---|---|---|---|
| CN | 105453070 | A | 3/2016 |
| CN | 107427716 | A | 12/2017 |

(Continued)

OTHER PUBLICATIONS

Bombeke, K. et al., "Do Not Disturb: Psychophysiological Corre-
lates of Boredom, Flow and Frustration During VR Gaming,"
International Conference on Image Analysis and Processing (ICIAP),
17th International Conference, Naples, Italy, 19 pages, Sep. 2013,
2013.
(Continued)

*Primary Examiner* — Shaheda A Abdin
(74) *Attorney, Agent, or Firm* — Thompson Hine LLP

(57) ABSTRACT

Various implementations disclosed herein include devices,
systems, and methods that determine an attentive state of a
user during an experience (e.g., visual and/or auditory
content that could include real-world physical environment,
virtual content, or a combination of each) based on the user's
gaze characteristic(s) to enhance the experience. For
example, an example process may include obtaining physi-
ological data associated with a gaze of a user during an
experience, determine a gaze characteristic during a segment
of the experience based on the obtained physiological data,
and determine that the user has a first attentive state during
the segment of the experience based on classifying the gaze
characteristic of the user during the segment of the experi-
ence.

19 Claims, 5 Drawing Sheets

Related U.S. Application Data continuation of application No. PCT/US2021/034185, filed on May 26, 2021.

(60) Provisional application No. 63/033,898, filed on Jun. 3, 2020.

(58) Field of Classification Search
CPC ......... A61B 5/165; A61B 3/113; A61B 3/032; A61B 3/111
See application file for complete search history.

(56) References Cited

U.S. PATENT DOCUMENTS

| | | | |
|---|---|---|---|
| 8,597,109 | B2 | 12/2013 | Herrmann |
| 8,979,545 | B2 | 3/2015 | Duffy |
| 9,596,508 | B2 | 3/2017 | McCoy et al. |
| 9,710,130 | B2 | 7/2017 | Mulcahy et al. |
| 10,231,614 | B2 | 3/2019 | Krueger |
| 10,303,245 | B2 | 5/2019 | Ha et al. |
| 10,572,005 | B2 | 2/2020 | Zahn |
| 10,620,700 | B2 | 4/2020 | Publicover et al. |
| 10,835,823 | B2 | 11/2020 | Sumant |
| 10,902,243 | B2 | 1/2021 | Wang |
| 10,952,006 | B1 | 3/2021 | Krol |
| 10,970,546 | B2 | 4/2021 | Yakishyn |
| 11,039,742 | B1 | 6/2021 | Abou Shousha |
| 11,354,805 | B2 | 6/2022 | Yildiz |
| 11,861,837 | B2 | 1/2024 | Yildiz |
| 12,099,654 | B1 | 9/2024 | Mulliken |
| 2006/0203197 | A1 | 9/2006 | Marshall |
| 2009/0086165 | A1* | 4/2009 | Beymer ................. A61B 3/113 |
| | | | 351/210 |
| 2011/0262887 | A1 | 10/2011 | Cleveland |
| 2012/0083668 | A1 | 4/2012 | Pradeep et al. |
| 2014/0177906 | A1 | 6/2014 | Horowitz |
| 2014/0184550 | A1 | 7/2014 | Hennessey et al. |
| 2014/0243093 | A1 | 8/2014 | Rom |
| 2015/0104771 | A1 | 4/2015 | Bernstein |
| 2015/0130703 | A1 | 5/2015 | Ghajar |
| 2015/0140528 | A1 | 5/2015 | Sikström |
| 2015/0213634 | A1 | 7/2015 | Kamarkar et al. |
| 2015/0297109 | A1 | 10/2015 | Garten et al. |
| 2015/0332166 | A1 | 11/2015 | Ferens et al. |
| 2016/0077547 | A1 | 3/2016 | Aimone et al. |
| 2016/0078369 | A1 | 3/2016 | Frank |
| 2016/0080874 | A1 | 3/2016 | Fullam |
| 2016/0150575 | A1 | 5/2016 | Andersen et al. |
| 2016/0196758 | A1 | 7/2016 | Causevic et al. |
| 2016/0225012 | A1 | 8/2016 | Ha et al. |
| 2016/0262680 | A1 | 9/2016 | Martucci |
| 2016/0263345 | A1 | 9/2016 | Shuster |
| 2016/0328015 | A1 | 11/2016 | Ha et al. |
| 2016/0372489 | A1 | 12/2016 | Li |
| 2017/0087470 | A1 | 3/2017 | Bostick |
| 2017/0131766 | A1 | 5/2017 | He et al. |
| 2017/0293356 | A1* | 10/2017 | Khaderi ................. A61B 3/113 |
| 2017/0352283 | A1 | 12/2017 | Lau |
| 2017/0357847 | A1 | 12/2017 | Jabri |
| 2017/0365101 | A1 | 12/2017 | Samec et al. |
| 2018/0139565 | A1 | 5/2018 | Norris |
| 2018/0184974 | A1 | 7/2018 | Cimenser et al. |
| 2018/0190309 | A1 | 7/2018 | Glasgow |
| 2018/0255167 | A1 | 9/2018 | Saito |
| 2018/0285442 | A1 | 10/2018 | Coleman et al. |
| 2018/0301053 | A1 | 10/2018 | Boccanfuso |
| 2018/0329727 | A1 | 11/2018 | Cao |
| 2018/0345128 | A1 | 12/2018 | Ahmed |
| 2018/0365491 | A1 | 12/2018 | Delaney |
| 2018/0365875 | A1 | 12/2018 | Yildiz |
| 2019/0019089 | A1 | 1/2019 | Baughman et al. |
| 2019/0033914 | A1 | 1/2019 | Aimone et al. |
| 2019/0108191 | A1* | 4/2019 | Frank ................... G06F 16/337 |
| 2019/0163258 | A1 | 5/2019 | Baughman et al. |
| 2019/0175090 | A1 | 6/2019 | Reiner et al. |

| | | | |
|---|---|---|---|
| 2019/0200920 | A1 | 7/2019 | Tien |
| 2019/0212824 | A1* | 7/2019 | Keller ..................... G06F 3/016 |
| 2019/0232500 | A1 | 8/2019 | Bennett et al. |
| 2019/0239790 | A1 | 8/2019 | Gross et al. |
| 2019/0265802 | A1* | 8/2019 | Parshionikar ........... G06F 3/012 |
| 2019/0355209 | A1 | 11/2019 | Sorey |
| 2020/0061465 | A1 | 2/2020 | Benedetto |
| 2020/0089317 | A1 | 3/2020 | Ghajar |
| 2020/0089321 | A1 | 3/2020 | Kacelenga |
| 2020/0103244 | A1 | 4/2020 | Cella |
| 2020/0206631 | A1 | 7/2020 | Sumant |
| 2020/0296480 | A1 | 9/2020 | Chappell, III |
| 2020/0298131 | A1 | 9/2020 | Pinto |
| 2020/0349337 | A1 | 11/2020 | Kameni |
| 2021/0035298 | A1 | 2/2021 | Yildiz et al. |
| 2021/0093967 | A1 | 4/2021 | Hooks |
| 2021/0192884 | A1 | 6/2021 | Idris |
| 2021/0272394 | A1 | 9/2021 | Cella |
| 2021/0287459 | A1 | 9/2021 | Cella |
| 2021/0298647 | A1 | 9/2021 | Axo et al. |
| 2021/0398539 | A1 | 12/2021 | Wexler |
| 2022/0086592 | A1 | 3/2022 | McElveen et al. |
| 2022/0261999 | A1 | 8/2022 | Yildiz |
| 2022/0312071 | A1 | 9/2022 | Devaraj |
| 2022/0382506 | A1 | 12/2022 | Hinckley |
| 2023/0080905 | A1 | 3/2023 | Tomczek |
| 2023/0259203 | A1 | 8/2023 | Mulliken |
| 2023/0282080 | A1 | 9/2023 | Mulliken |
| 2023/0308505 | A1 | 9/2023 | Sharma |
| 2024/0103617 | A1 | 3/2024 | Yerkes |
| 2024/0164677 | A1 | 5/2024 | Yildiz |
| 2024/0211200 | A1 | 6/2024 | Silfvast |
| 2024/0335738 | A1 | 10/2024 | Lake-Schaal |

FOREIGN PATENT DOCUMENTS

| | | |
|---|---|---|
| CN | 109620265 A | 4/2019 |
| JP | 2018194931 A | 12/2018 |
| RU | 2441585 C1 | 2/2012 |
| WO | WO2013015730 A1 | 1/2013 |
| WO | 2015072202 A1 | 5/2015 |
| WO | WO2015072202 | 5/2015 |
| WO | WO2018100875 A1 | 6/2018 |
| WO | WO2019067731 A1 | 4/2019 |
| WO | 2020159784 A1 | 8/2020 |
| WO | WO2020159784 | 8/2020 |
| WO | WO2020227254 | 11/2020 |
| WO | WO2021150971 | 7/2021 |
| WO | 2021247310 A1 | 12/2021 |
| WO | 2021247312 A1 | 12/2021 |
| WO | 2022212070 A1 | 10/2022 |

OTHER PUBLICATIONS

Kuziek, J. et al., "Real brains in virtual worlds: Validating a novel oddball paradigm in virtual reality," bioRxiv, 45 pages, https://www.biorxiv.org/content/10.1101/749192v3.full.pdf, Mar. 2020, 2020.

Rizzo, A. et al., "Virtual Reality and Cognitive Assessment and Rehabilitation: The State of the Art," Virtual Reality in Neuro-Psycho-Physiology, Giuseppe Riva (Ed.), 26 pages, 1997, 1997.

Bixler, Robert et al., "Automatic gaze-based user-independent detection of mind wandering during computerized reading," User Modeling and User-Adapted Interaction, Dordrecht, NL, vol. 26, No. 1, pp. 33-68, Sep. 2015, 2015.

Parsons, T.D. and Reinebold, J.L., "Adaptive Virtual Environments for Neuropsychological Assessment in Serious Games," IEEE Transactions on Consumer Electronics, vol. 58, No. 2, May 2012, 2012.

Black, Rosemary, "Virtual Reality Programs Now Target Pain, Stress and Depression"; Published Jun. 24, 2020; pp. 1-6, 2020.

Black, Rosemary, "Learn to Practice CBT and ACT at Home"; Published Oct. 21, 2019; pp. 1-4, 2019.

European Patent Office, Communication pursuant to Article 94(3) EPC issued in European Patent Application No. 21733636.1 dated May 2, 2024 (Six (6) pages).

(56) References Cited

OTHER PUBLICATIONS

European Patent Office, Communication pursuant to Article 94(3) EPC issued in European Patent Application No. 21733636.1 dated May 27, 2025 (Five (5) pages).

* cited by examiner

300

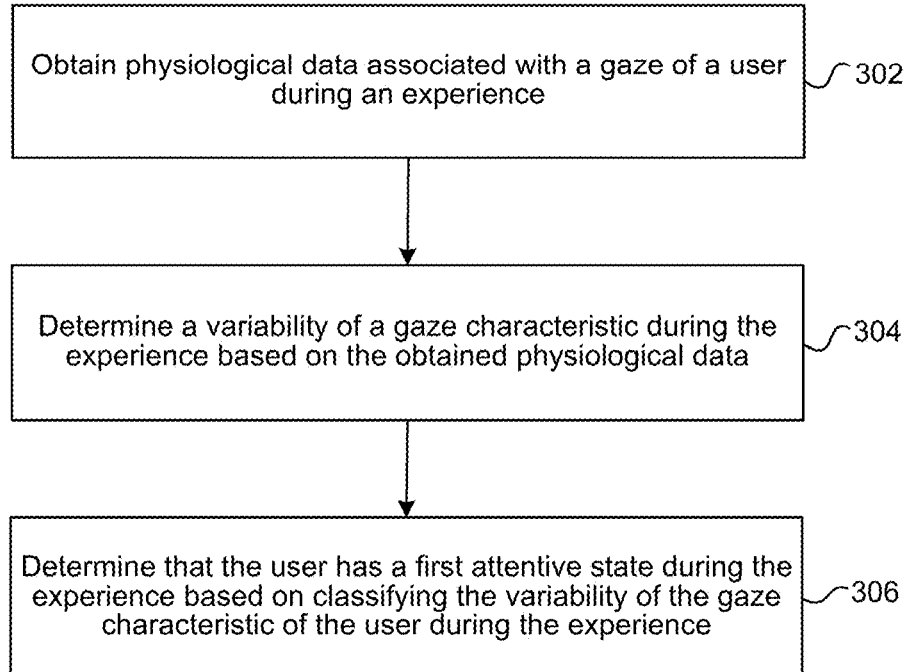

Obtain physiological data associated with a gaze of a user during an experience — 302

Determine a variability of a gaze characteristic during the experience based on the obtained physiological data — 304

Determine that the user has a first attentive state during the experience based on classifying the variability of the gaze characteristic of the user during the experience — 306

FIG. 3

Device 600

EYE-GAZE BASED BIOFEEDBACK

CROSS-REFERENCE TO RELATED APPLICATIONS

This patent application is a continuation of U.S. application Ser. No. 18/072,796 filed Dec. 1, 2022, which is a continuation of International Application No. PCT/US2021/034185 filed May 26, 2021, which claims the benefit of U.S. Provisional Application No. 63/033,898 filed Jun. 3, 2020, each of which is incorporated herein by reference in its entirety.

TECHNICAL FIELD

The present disclosure generally relates to displaying content with electronic devices, and in particular, to systems, methods, and devices to determine a user's attentive state during the displaying of the content.

BACKGROUND

A user's cognitive state and more specifically a user's attentive state, while viewing content on an electronic device, can have a significant effect on the user's experience. For example, staying focused and engaged while using a head-mounted device (HMD) in an extended reality (XR) environment may be required for meaningful experiences, such as meditation, learning a new skill, watching educational or entertaining content, or reading a document. Improved techniques for assessing the attentive states of users viewing and interacting with content may enhance a user's enjoyment, comprehension, and learning of the content. Moreover, content may not be presented in a way that makes sense to a particular user. Content creators and display systems may be able to provide better and more tailored user experiences that a user is more likely to enjoy, comprehend, and learn from based on being able to determine the user's cognitive state.

SUMMARY

Various implementations disclosed herein include devices, systems, and methods that determine an attentive state of a user during or after the presenting of content (e.g., visual and/or auditory content that could include real-world physical environment, virtual content, or a combination of each) based on the user's gaze characteristic(s) to enhance the experience. The device (e.g., a handheld, laptop, desktop, or head-mounted device (HMD)) provides content (e.g., a visual and/or auditory experience) to the user and obtains, with a sensor, physiological data (e.g., gaze characteristics) associated with a response of the user to the content. Based on the obtained physiological data, the techniques described herein can determine a user's attentive state (e.g., meditating vs. mind wandering) during or after the presenting (e.g., a meditation experience) by classifying the user's gaze characteristic(s). Based on the classified gaze characteristic(s), the techniques can provide feedback to the user that the current attentive state differs from an intended attentive state of the content, recommend similar content or similar portions of the content, and/or adjust content or feedback mechanisms corresponding to the content based on the current attentive state differing from an intended attentive state of the content.

In an exemplary implementation, the integration of meditation and mindfulness practices with techniques described herein can enhance a meditation experience by providing individuals with real-time feedback on meditation performance. Staying focused and engaged during meditation while using an HMD in an extended reality (XR) setting can improve the user's meditation practice and help a user gain the benefits associated with meditation. For example, novices who are interested in meditating may have trouble staying on task during a meditation session, and they may benefit from accurate feedback on their performance. The techniques described herein can detect when users get distracted while meditating based on a user's variability in gaze characteristics. Finding defined markers of attention lapses and providing performance feedback during meditation could enhance a user experience, provide additional benefits from the meditation session, and provide a guided and supportive teaching approach (e.g., a scaffolding teaching method) for users to advance through their meditation practice.

Eye gaze patterns can vary based on the attention state of an individual and characteristics of the scene in front of him or her. These patterns can be obtained while using an HMD with eye tracking technology while users perform mindfulness tasks that demand varying levels of attention, such as focused attention to breath meditation. Over the course of a meditation session, attention can fluctuate towards and away from the breath. When an individual focuses on his or her breath during an eyes-open meditation task, eye gaze may be slow in time and constrained to a particular area of the scene. When the individual loses focus and starts to mind wander, eye gaze stability may decrease and/or eye gaze velocity may increase. Observing repeated measures of eye gaze velocity and position over a duration of time (seconds to minutes) can give insights about the underlying attention state of the user at different time scales. These metrics of attention can be used to provide feedback during a meditation experience.

Other examples of experiences other than a meditation experience can utilize the techniques described herein regarding attention states. For example, an education experience could notify a student to stay on track when he or she appears to be mind wandering. Another example may be a workplace experience of notifying a worker who needs to be focused on his or her current task at hand. For example, providing feedback to a surgeon who may be getting a little tired during a long surgery, alerting a truck driver on a long drive he or she is losing focus and may need to pull over to sleep, and the like. The techniques described herein can be customized to any user and experience that may need some type of feedback mechanism to maintain one or more particular attentional states.

In general, one innovative aspect of the subject matter described in this specification can be embodied in methods that include the actions of obtaining physiological data associated with a gaze of a user during or after presenting of content, determining a variability of a gaze characteristic based on the obtained physiological data, and determining that the user has a first attentive state during the presenting based on classifying the variability of the gaze characteristic of the user during the presenting.

These and other embodiments can each optionally include one or more of the following features.

In some implementations, the method further includes presenting feedback during the content in response to determining that the first attentive state differs from a second attentive state intended for the content. In some implementations, the method further includes adjusting the content in response to determining that the first attentive state differs from a second attentive state intended for the content.

In some implementations, the gaze characteristic is a direction of the gaze, a velocity of the gaze, or gaze fixations. In some implementations, the gaze characteristic is derived from a saccade characteristic.

In some implementations, the physiological data includes an image of an eye or electrooculography (EOG) data. In some implementations, the variability of the gaze characteristic is classified using a statistical technique or a machine learning technique. In some implementations, the variability of the gaze characteristic is classified based on comparing the variability of the gaze characteristic to a threshold.

In some implementations, the device is a head-mounted device (HMD). In some implementations, the content is an extended reality (XR) experience that is presented to the user. In some implementations, the content is a mixed reality (MR) experience that is presented to the user. In some implementations, the content is a real-world experience that is presented to the user. In some implementations, the content is a meditation experience.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method for classifying variability of gaze characteristic(s) to determine an attentive state of a user.

Figure 2:
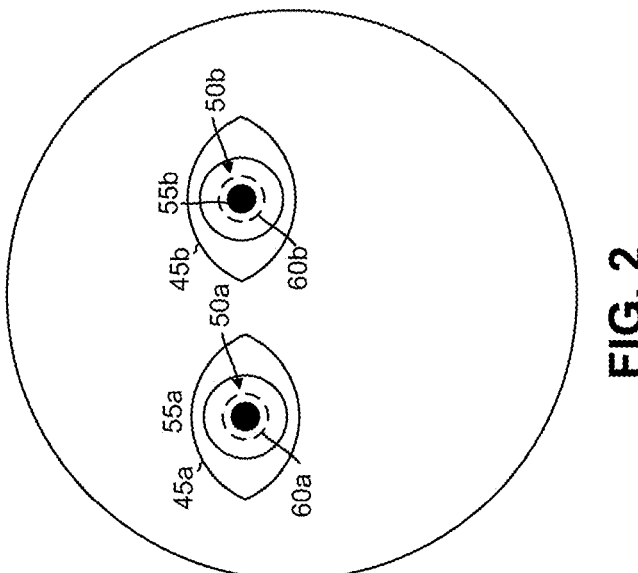
FIG. 2 illustrates a pupil of the user of FIG. 1 in which gaze characteristic(s) varies with time in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
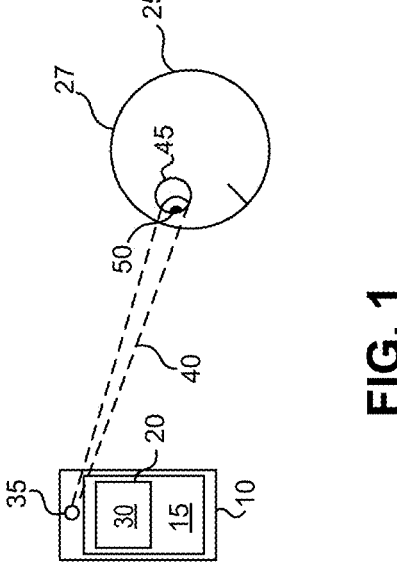
FIG. 1 illustrates a device displaying a visual experience and obtaining physiological data from a user according to some implementations.

FIG. 1 illustrates a real-world environment 5 including a device 10 with a display 15. In some implementations, the device 10 displays content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of green highlighting covering or surrounding content 20.

In some implementations, content 20 may be a visual experience (e.g., a meditation experience), and the visual characteristic 30 of the visual experience may continuously change during the visual experience. As used herein, the phrase "experience" refers to a period of time during which a user uses an electronic device and has one or more attentional states. In one example, a user has an experience in which the user perceives a real-world environment while holding, wearing, or being proximate to an electronic device that includes one or more sensors that obtain physiological data to assess an eye characteristic that is indicative of the user's attentional state. In another example, a user has an experience in which the user perceives content displayed by an electronic device while the same or another electronic obtains physiological data to assess the user's eye characteristic and/or attentional state. In another example, a user has an experience in which the user holds, wears, or is proximate to an electronic device that provides a series of audible or visual instructions that guide the experience. For example, the instructions may instruct the user to have particular attentional states during particular time segments of the experience, e.g., instructing the user to focus on his or her breath for the first 30 seconds, to stop focusing on his her breath for the next 30 seconds, to refocus on his or her breath for the next 45 seconds, etc. During such an experience, the same or another electronic device may obtain physiological data to assess the user's eye characteristic and/or attentional state."

In some implementations, the visual characteristic 30 is a feedback mechanism for the user that is specific to the experience (e.g., a visual or audio cue to focus on a particular task during an experience, such as breathing during a meditation experience). In some implementations, the visual experience (e.g., content 20) can occupy the entire display area of display 15. For example, during a meditation experience, content 20 may be a meditation video or sequence of images that may include visual and/or audio cues as the visual characteristic 30 presented to the user to focus on breathing. Other visual experiences that can be displayed for content 20 and visual and/or audio cues for the visual characteristic 30 will be further discussed herein.

The device 10 obtains physiological data (e.g., pupillary data) from the user 25 via a sensor 35. For example, the device 10 obtains eye gaze characteristic data 40. While this example and other examples discussed herein illustrate a single device 10 in a real-world environment 5, the techniques disclosed herein are applicable to multiple devices as well as to other real-world environments. For example, the functions of device 10 may be performed by multiple devices.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable head mounted display (HMD).

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., eye gaze characteristic data 40). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

FIG. 2 illustrates pupils 50*a*-*b* of the user 25 of FIG. 1 in which the diameters of the pupils 50*a*-*b* varies with time. As shown in FIG. 2, a present physiological state (e.g., present pupil diameter 55*a*-*b*) may vary in contrast to a past physiological state (e.g., past pupil diameter 60*a*-*b*) For example, the present physiological state may include a present pupil diameter and a past physiological state may include a past pupil diameter.

The physiological data may vary in time and the device 10 may use the physiological data to measure one or both of a user's physiological response to the visual characteristic 30 or the user's intention to interact with content 20. For example, when presented with content 20, such as a list of experiences, by a device 10, the user 25 may select an experience without requiring the user 25 to complete a physical button press. In some implementations, the physiological data includes the response of a radius of the pupil 50 after the user 25 glances at content 20, measured via eye-tracking technology.

Returning to FIG. 1, according to some implementations, the device 10 may generate and present an extended reality (XR) environment to their respective users. A person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 3 is a flowchart illustrating an exemplary method 300. In some implementations, a device such as device 10 (FIG. 1) performs the techniques of method 300 to determine an attentive state of a user during an experience (e.g., visual and/or auditory electronic content that could be of the real-world physical environment, virtual content, or a combination of each) based on the user's gaze characteristic(s) to enhance the experience. In some implementations, the techniques of method 300 are performed on a mobile device, desktop, laptop, HMD, or server device. In some implementations, the method 300 is performed on processing logic, including hardware, firmware, software, or a combination thereof. In some implementations, the method 300 is performed on a processor executing code stored in a non-transitory computer-readable medium (e.g., a memory).

At block 302, the method 300 obtains physiological data associated with a gaze of a user during an experience. For example, obtaining physiological data (e.g., eye gaze characteristic data 40) associated with a gaze of a user may involve obtaining images of the eye or electrooculography signal (EOG) data from which gaze direction and/or movement can be determined. In some implementations, the experience may be a meditation experience provided while a user wears a device such as an HMD. Such a meditation experience may include one or more time segments requiring one or more attentive states, e.g., focused on breath vs unfocused/mind wandering. In some implementations, the experience is a real-world experience that is presented to the user. For example, the experience may include a real time video of a physical environment (e.g., a live scenic view of nature for meditation) or a live view through an HMD (e.g., the user is located at a real-world scenic view of nature for meditation, such as a quiet park). Additionally, the experience may be a mixed reality (MR) experience that is presented to the user where virtual reality images maybe overlaid onto the live view (e.g., augmented reality (AR)) of the physical environment.

At block 304, the method 300 determines a variability of a gaze characteristic during the experience based on the obtained physiological data. For example, gaze characteristics may include variability of gaze direction, variability of gaze velocity, variability of gaze fixations derived from eye gaze dynamics and saccade characteristics. In some implementations, variability may be measured based on range, variance, and/or standard deviation. In some implementations, variability is determined over a time interval (e.g., 10-30 seconds), and inferences are measured within each time interval (e.g., every 1 to 10 seconds). For example, in one exemplary implementation, 20 second time windows are used with inferences every 2 seconds. A time window (e.g., the exemplary 20 second time window) can be determined by comparing classifier performance across a range of time windows.

In some implementations, the gaze characteristic (e.g., eye gaze characteristic data 40) is a direction of the gaze, a velocity of the gaze, and/or gaze fixations (e.g., derived from eye gaze dynamics and saccade characteristics). In some implementations, the gaze characteristic is derived from a saccade characteristic (e.g., microsaccades and saccadic intrusions). In some implementations, other measures of gaze characteristic stability can include intersaccade interval (amount of time between saccades), microsaccade rate, and determined head movements from IMU and/or cameras (e.g., IMU and/or cameras on a device, such as device 10 of FIG. 1).

At block 306, the method 300 determines that the user has a first attentive state during the experience based on classifying the variability of the gaze characteristic of the user during the experience. For example, one or more gaze characteristics may be determined, aggregated, and used to classify the user's attentive state using statistical or machine learning techniques. In some implementations, the variability of the gaze characteristic is classified based on comparing the variability of the gaze characteristic to a threshold. For example, if the baseline for a user's eye position is determined (e.g., at baseline of X eye position of "0") during an initial segment of time (e.g., 30 seconds), and during a subsequent segment of time (e.g., 30 seconds) the average eye position deviates more than +/−0.2 from the baseline during the subsequent segment of time, than the techniques described herein could classify the user as transitioned away from the first attentive state (e.g., meditation) and entered a second attentive state (e.g., mind wandering). In some implementations, the dynamics may be continuously measured in the last 30 seconds and the model output can be updated frequently (e.g., every 2 seconds). In some implementations, ratings may be collected from a participant over time where they had positive (e.g., attentive) or negative (e.g., mind-wandering) meditation experience and use the gaze statistics from those sessions to train a machine learning algorithm. This algorithm then can be used on the same person to provide personalized feedback for future sessions.

In some implementations, feedback can be provided to a user based on determining that the first attentive state (e.g., mind wandering) differs from an intended attentive state (e.g., meditation) of the experience. In some implementations, the method 300 may further include presenting feedback (e.g., audio feedback such as "control your breathing", visual feedback, etc.) during the experience in response to determining that the first attentive state differs from a second attentive state intended for the experience. In one example, during a portion of a meditation experience in which a user is directed to focus on his or her breath, the method determines to present feedback reminding the user to focus on breathing based on detecting that the user is instead in a mind wandering attentive state.

In some implementations, content recommendation for an experience developer can be provided based on determining attentive states during the presented experience and changes of the experience presented therein. For example, the user may focus well when particular types of content are provided. In some implementations, the method 300 may further include identifying content based on similarity of the content to the experience, and providing a recommendation of the content to the user based on determining that the user has the first attentive state during the experience (e.g., mind wandering).

In some implementations, content for the experience can be adjusted corresponding to the experience based on the attentive state differing from an intended attentive state for the experience. For example, content may be adjusted by an experience developer to improve recorded content for a subsequent use for the user or other users. In some implementations, the method 300 may further include adjusting content corresponding to the experience in response to determining that the first attentive state differs from a second attentive state intended for the experience.

In some implementations, the techniques described herein obtain physiological data (e.g., eye gaze characteristic data 40) from the user based on identifying typical interactions of the user with the experience. For example, the techniques may determine that a variability of a gaze characteristic of the user correlates with an interaction with the experience. Additionally, the techniques described herein may then adjust a visual characteristic of the experience to enhance gaze characteristics associated with future interactions with the experience. Moreover, in some implementations, changing a visual characteristic of the experience after the user interacts with the experience informs the physiological response of the user in subsequent interactions with the experience or a particular segment of the experience. For example, the user may present an anticipatory physiological response associated with the change in a visual characteristic prior to the visual characteristic being changed within the experience. Thus, in some implementations, the technique identifies an intent of the user to interact with the experience based on an anticipatory physiological response. For example, the technique may adapt or train an instruction set by capturing or storing a gaze characteristic(s) of the user based on the interaction of the user with the experience, including the user's response to an enhanced visual characteristic of the experience, and may detect a future intention of the user to interact with the experience by identifying a physiological response of the user in anticipation of display of the enhanced visual characteristic (e.g., prior to the interaction with a particular segment of the experience).

In some implementations, an estimator or statistical learning method is used to better understand or make predictions about the physiological data (e.g., gaze characteristics). For example, statistics for gaze characteristic data may be estimated by sampling a dataset with replacement (e.g., a bootstrap method).

FIGS. 4-5 present graphical examples of eye gaze characteristics associated with two example participants during a meditation session (e.g., an experience). In some implementations, the techniques described herein can present an experience to a user (e.g., a meditation experience) and track variability in eye gaze characteristics associated with the user. For example, eye gaze patterns can vary based on the attention state of an individual and characteristics of the scene in front of them. These patterns can be obtained while using an HMD with eye tracking technology while users perform mindfulness tasks that demand varying levels of attention, such as focused attention to breath meditation. Over the course of the meditation session, an individual's attention can fluctuate towards and away from the breath (e.g., a controlled/focused breathing technique). When an individual focuses on his or her breath during an eyes-open meditation task, eye gaze direction may be slow in time and constrained to a particular area of the scene. When the individual loses focus and starts to mind wander, eye gaze stability may decrease and/or eye gaze velocity may increase. Observing repeated measures of eye gaze velocity and position over a duration of time (seconds to minutes) can give insights about the underlying attention state of the user at different time scales. These metrics of attention, as illustrated in FIGS. 4-5, can be used to provide feedback during a meditation experience.

Figures 4A, 4B:
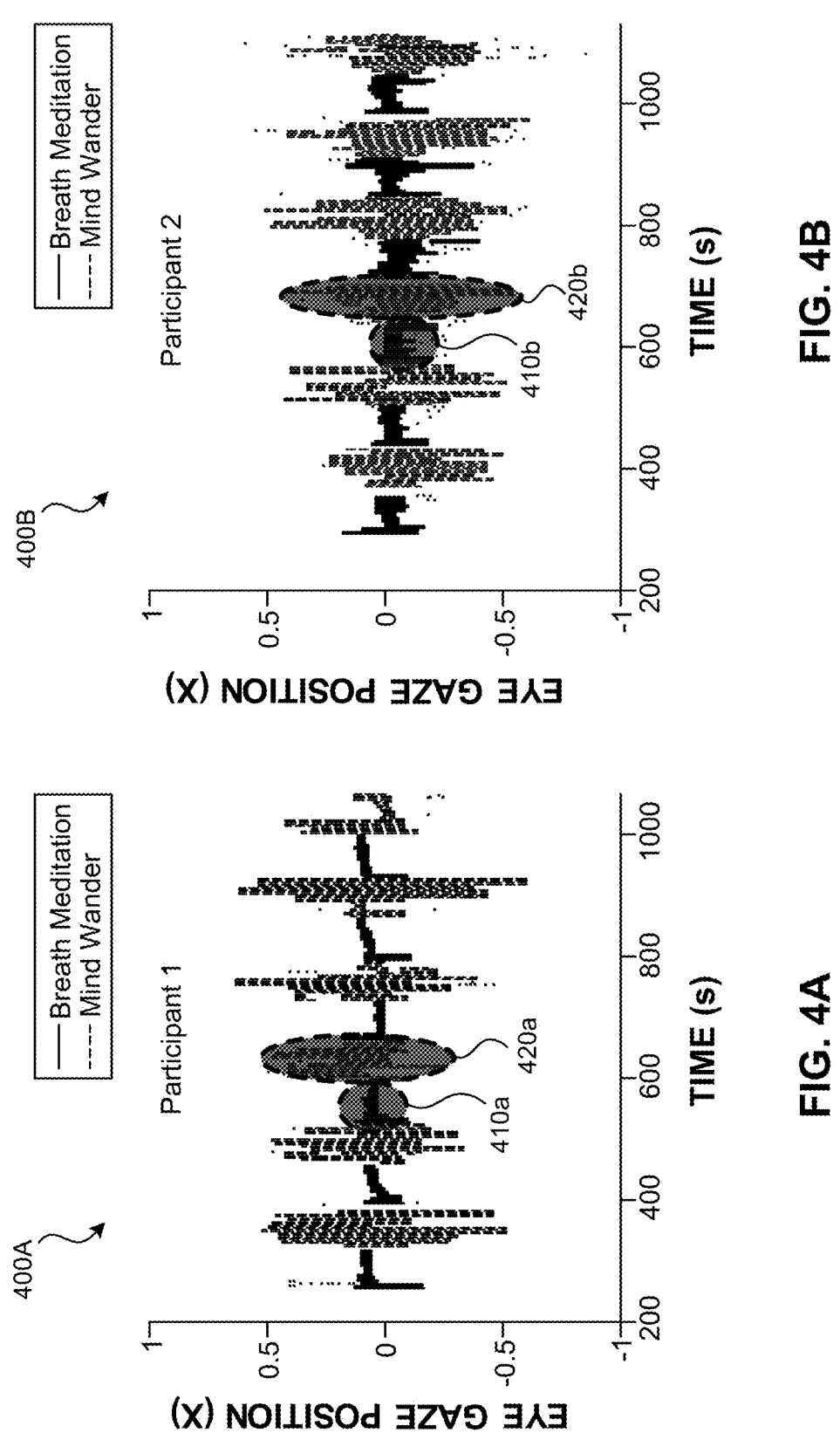
FIGS. 4A and 4B are charts illustrating variability of a gaze characteristic of a user during two different attentive states.

FIGS. 4A and 4B illustrate charts 400A and 400B, respectively, of variability of an eye gaze characteristic, e.g., an eye gaze position (X) (y-axis) over time (x-axis) for a first and a second participant, respectively. Area 410a and area 410b represent a segment of a meditation experience where each user is focused on his or her breathing techniques during an eyes-open meditation task. For example, the user is provided with a visual or auditory cue to control his or her breathing and focus on his or her meditation techniques. Area 420a and area 420b represent a segment of a meditation experience where each user is not focused on his or her breathing techniques. For example, the user is provided with an instruction to stop focusing on his or her breath during these portions and thus the users' focus on his or her meditation techniques may decline. As evident in charts 400A and 400B, there is a statistical correlation to eye gaze position (X) when the user is focused on breathing as opposed to mind wandering, specifically there is greater stability and less variability when the user is focusing on his or her breadth than when the user's mind is wandering.

Figures 5A, 5B:
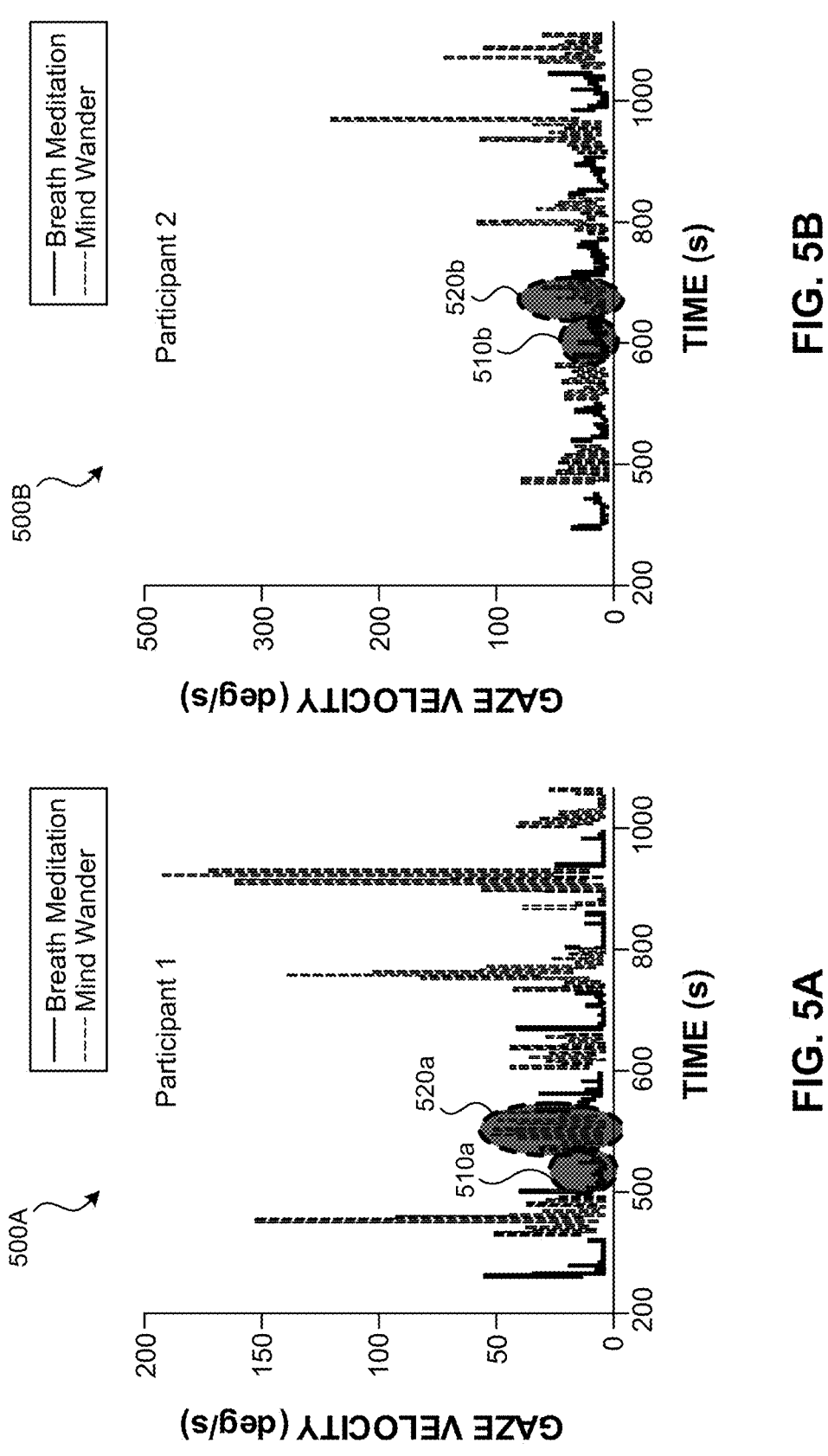
FIGS. 5A and 5B are charts illustrating variability of a gaze characteristic of a user during two different attentive states.

FIGS. 5A and 5B illustrate charts 500A and 500B, respectively, of variability of an eye gaze characteristic, e.g., gaze velocity (y-axis) over time (x-axis) for a first and a second participant, respectively. Area 510a and area 510b represent a segment of a meditation experience where each user is focused on his or her breathing techniques during an eyes-open meditation task. For example, the user is provided with a visual or auditory cue to control his or her breathing and focus on his or her meditation techniques. Area 520a and area 520b represent a segment of a meditation experience where each user is not focused on his or her breathing techniques. For example, the user is provided with an instruction to stop focusing on his or her breath during these portions and thus the users' focus on his or her meditation techniques declines. As evident in charts 500A and 500B, there is a statistical correlation to gaze velocity when the user is focused on breathing as opposed to mind wandering, specifically there is greater stability and less variability when the user is focusing on his or her breadth than when the user's mind is wandering.

In some implementations, the techniques could be trained on many sets of user physiological data and then adapted to each user individually. For example, content creators can customize a meditation experience based on the user physiological data, such as a user may require background music for meditation, or require more or less audio or visual cues to continue to maintain meditation.

In some implementations, customization of the experience could be controlled by the user. For example, a user could select the meditation experience he or she desires, such as he or she can choose the ambience, background scene, music, etc. Additionally, the user could alter the threshold of providing the feedback mechanism. For example, the user can customize the sensitivity of triggering the feedback mechanism based on prior experience of a session. For example, a user may desire to not have as many feedback notifications and allow some mind wandering (e.g., eye position deviations) before a notification is triggered. Thus, particular experiences can be customized on triggering a threshold when higher criteria is met. For example, some experiences, such as an education experience, a user may not want to be bothered during a study session if he or she is briefly staring off task or mind wandering (e.g., not looking at the screen or the book) for a moment (e.g., less than 30 seconds) to contemplate what he or she just read. However, the student/reader would want to be given a notification if he or she is mind wandering for a longer period (e.g., longer than or equal to 30 seconds).

In some implementations, the techniques described herein can account for real-world environment 5 of the user 25 (e.g., visual qualities such as luminance, contrast, semantic context) in its evaluation of how much to modulate or adjust the experience or feedback mechanisms to enhance the physiological response (e.g., pupillary response) of the user 25 to the visual characteristic 30 (e.g., feedback mechanism).

In some implementations, the physiological data (e.g., eye gaze characteristic data 40) may vary in time and the techniques described herein may use the physiological data to detect a pattern. In some implementations, the pattern is a change in physiological data from one time to another time, and, in some other implementations, the pattern is series of changes in physiological data over a period of time. Based on detecting the pattern, the techniques described herein can identify a change in the attentive state of the user (e.g., mind wandering) and can then provide a feedback mechanism (e.g., visual or auditory cue to focus on breathing) to the user 25 to return to an intended state (e.g., meditation) during an experience (e.g., meditation session). For example, an attentive state of a user 25 may be identified by detecting a pattern in a user's gaze characteristic, a visual or auditory cue associated with the experience may be adjusted (e.g., a feedback mechanism of a voice that states "focus on breathing" may further include a visual cue or a change in ambience of the scene), and the user's gaze characteristic compared to the adjusted experience can be used to confirm the attentive state of a user.

In some implementations, the techniques described herein can utilize a training or calibration sequence to adapt to the specific physiological characteristics of a particular user 25. In some implementations, the techniques present the user 25 with a training scenario in which the user 25 is instructed to interact with on-screen items (e.g., feedback objects). By providing the user 25 with a known intent or area of interest (e.g., via instructions), the techniques can record the user's physiological data (e.g., eye gaze characteristic data 40) and identify a pattern associated with the user's gaze. In some implementations, the techniques can change a visual characteristic 30 (e.g., a feedback mechanism) associated with content 20 (e.g., an experience) in order to further adapt to the unique physiological characteristics of the user 25. For example, the techniques can direct a user to mentally select the button in the center of the screen on the count of three and record the user's physiological data (e.g., eye gaze characteristic data 40) to identify a pattern associated with the user's attentive state. Moreover, the techniques can change or alter a visual characteristic associated with the button in order to identify a pattern associated with the user's physiological response to the altered visual characteristic. In some implementations, the pattern associated with the physiological response of the user 25 is stored in a user profile associated with the user and the user profile can be updated or recalibrated at any time in the future. For example, the user profile could automatically be modified over time during a user experience to provide a more personalized user experience (e.g., a personal meditation experience).

In some implementations, a machine learning model (e.g., a trained neural network) is applied to identify patterns in physiological data, including identification of physiological responses to an experience (e.g., content 20 of FIG. 1). Moreover, the machine learning model may be used to match the patterns with learned patterns corresponding to indications of interest or intent of the user 25 to interact with the experience. In some implementations, the techniques described herein may learn patterns specific to the particular user 25. For example, the techniques may learn from determining that a peak pattern represents an indication of interest or intent of the user 25 in response to a particular visual characteristic 30 within the experience and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the experience.

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter 55 to be calculated based on a single calibration of user 25. Utilizing techniques such as pupil-center-corneal reflection (PCCR), pupil tracking, and pupil shape, the device 10 may calculate the pupil diameter 55, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

In some implementations, the techniques described herein can identify a particular object within the experience presented on the display 15 of the device 10 at a position in the direction of the user's gaze. Moreover, the techniques can change a state of the visual characteristic 30 associated with the particular object or the overall experience responsively to a spoken verbal command received from the user 25 in combination with the identified attentive state of the user 25. For example, a particular object within the experience may be an icon associated with a software application, and the user 25 may gaze at the icon, say the word "select" to choose the application, and a highlighting effect may be applied to the icon. The techniques can then use further physiological data (e.g., eye gaze characteristic data 40) in response to the visual characteristic 30 (e.g., a feedback mechanism) to further identify an attentive state of the user 25 as a confirmation of the user's verbal command. In some implementations, the techniques can identify a given interactive item responsive to the direction of the user's gaze, and to manipulate the given interactive item responsively to physiological data (e.g., variability of the gaze characteristics). The techniques can then confirm the direction of the user's gaze based on further identifying attentive states of a user with physiological data. In some implementations, the techniques can remove an interactive item or object based on the identified interest or intent. In other implementations, the techniques can automatically capture images of the content at times when an interest or intent of the user 25 is determined.

As a power saving feature, the techniques described herein can detect when the user 25 is not looking at the display and the techniques described herein can activate a power saving technique, e.g., disabling physiological sensors when the user 25 looks away for more than some threshold period of time. Furthermore, in some implementations, the techniques can dim or darken the display (e.g., decrease the brightness) entirely when the user 25 is not looking at the display. When the user 25 looks back toward the display, the techniques can deactivate the power saving techniques. In some implementations, the techniques can track a physiological attribute using a first sensor and then activate a second sensor to obtain the physiological data based on the tracking. For example, the techniques can use a camera (e.g., a camera on the device 10) to identify that the user 25 is looking in the direction of the device 10 and then activate an eye sensor when it is determined that the user 25 is looking in the direction of the device 10.

In some implementations, the techniques described herein can utilize a training or calibration sequence to adapt to the specific physiological characteristics of a particular user 25 during an experience. In some implementations, the techniques can present the user 25 with a training scenario experience in which the user 25 is instructed to interact with on-screen items. By providing the user 25 with one or more known visual characteristics 30 associated with known objects within an experience, the device 10 may record the user's physiological data and the techniques can identify a pattern associated with the user's intent or interest. For example, the techniques can direct a user 25 to focus on a red button in the center of the display 15 on the count of three and record the user's physiological data to identify a pattern associated with the user's intent or interest as it relates to the red visual characteristic 30. The techniques can then repeat the same process with a number of other differently colored buttons in order to identify a color that elicits the highest physiological response for the user 25. In some implementations, the pattern associated with the user's intent or interest, physiological data associated with particular visual characteristics 30, or a ranking or analysis of particular visual characteristics 30 in relation to the user 25 are stored in a user profile associated with the user and the user profile can be updated or recalibrated at any time in the future. For example, the user profile could automatically be modified over time during a user experience to provide a more personalized user experience.

Figure 6:
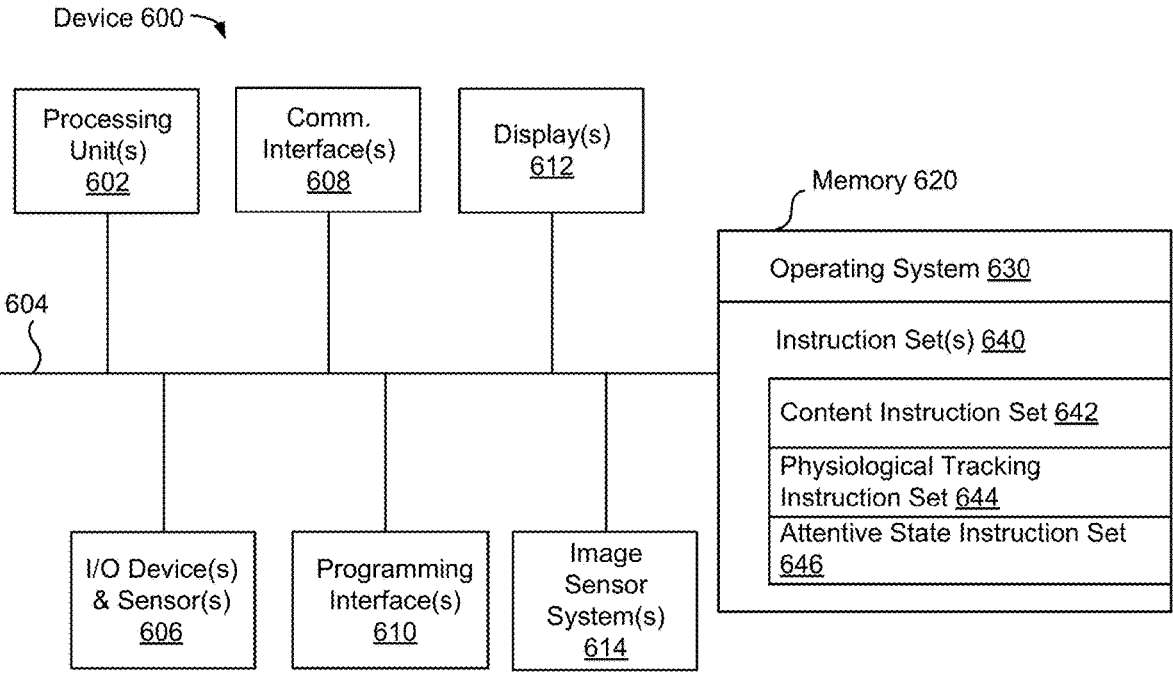
FIG. 6 is a block diagram illustrating device components of an exemplary device according to some implementations.

FIG. 6 is a block diagram of an example device 600. Device 600 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. wave-guide displays. In one example, the device 10 includes a single display. In another example, the device 10 includes a display for each eye of the user.

In some implementations, the one or more image sensor systems 614 are configured to obtain image data that corresponds to at least a portion of the physical environment 5. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 include a content instruction set 642, a physiological tracking instruction set 644, and an attentive state instruction set 646. The instruction set(s) 640 may be embodied a single software executable or multiple software executables.

In some implementations, the content instruction set 642 is executable by the processing unit(s) 602 to provide and/or track content for display on a device. The content instruction set 642 may be configured to monitor and track the content over time (e.g., during an experience such as a meditation session) and/or to identify change events that occur within the content. In some implementations, the content instruction set 642 may be configured to inject change events into content (e.g., feedback mechanisms) using one or more of the techniques discussed herein or as otherwise may be appropriate. To these ends, in various implementations, the instruction includes instructions and/or logic therefor, and heuristics and metadata therefor.

In some implementations, the physiological tracking (e.g., eye gaze characteristics) instruction set 644 is executable by the processing unit(s) 602 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

In some implementations, the attentive state instruction set 646 is executable by the processing unit(s) 602 to assess the cognitive state (e.g., attentive state such as mind wandering, meditation, etc.) of a user based on a physiological response (e.g., eye gaze response) using one or more of the techniques discussed herein or as otherwise may be appropriate. To these ends, in various implementations, the instruction includes instructions and/or logic therefor, and heuristics and metadata therefor.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 7:
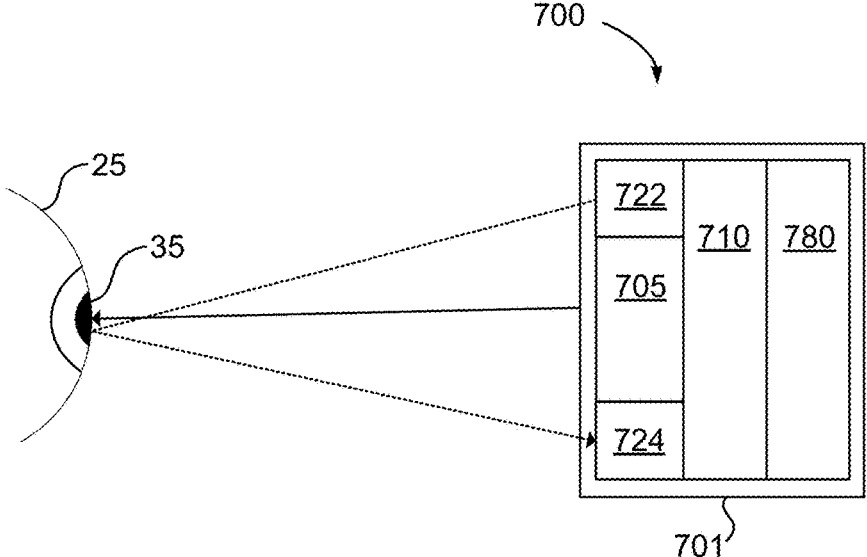
FIG. 7 is a block diagram of an example head-mounted device (HMD) in accordance with some implementations.

FIG. 7 illustrates a block diagram of an exemplary head-mounted device 700 in accordance with some implementations. The head-mounted device 700 includes a housing 701

(or enclosure) that houses various components of the head-mounted device 700. The housing 701 includes (or is coupled to) an eye pad (not shown) disposed at a proximal (to the user 25) end of the housing 701. In various implementations, the eye pad is a plastic or rubber piece that comfortably and snugly keeps the head-mounted device 700 in the proper position on the face of the user 25 (e.g., surrounding the eye of the user 25).

The housing 701 houses a display 710 that displays an image, emitting light towards or onto the eye of a user 25. In various implementations, the display 710 emits the light through an eyepiece having one or more lenses 705 that refracts the light emitted by the display 710, making the display appear to the user 25 to be at a virtual distance farther than the actual distance from the eye to the display 710. For the user 25 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, and a controller 780. The one or more light sources 722 emit light onto the eye of the user 25 that reflects as a light pattern (e.g., a circle of glints) that can be detected by the camera 724. Based on the light pattern, the controller 880 can determine an eye tracking characteristic of the user 25. For example, the controller 780 can determine a gaze direction and/or a blinking state (eyes open or eyes closed) of the user 25. As another example, the controller 780 can determine a pupil center, a pupil size, or a point of regard. Thus, in various implementations, the light is emitted by the one or more light sources 722, reflects off the eye of the user 25, and is detected by the camera 724. In various implementations, the light from the eye of the user 25 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 710 by looking at it), provide foveated rendering (e.g., present a higher resolution in an area of the display 710 the user 25 is looking at and a lower resolution elsewhere on the display 710), or correct distortions (e.g., for images to be provided on the display 710).

In various implementations, the one or more light sources 722 emit light towards the eye of the user 25 which reflects in the form of a plurality of glints.

In various implementations, the camera 724 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. In some instances, this gathered data may include personal information. For example, such information may include data that uniquely identifies a specific person or can be used to identify interests, characteristics, or behaviors of an individual. Such information data can include physiological data, demographic data, location data, device characteristics of personal devices, or any other personal information. Such information can be used to the benefit of users. For example, personal information data be used to improve interaction and control capabilities of an electronic device. Any personal information and/or physiological data should be used in accordance with well-established privacy policies and/or privacy practices. Such policies and practices should meet or exceed industry or governmental information privacy and data requirements. The collection of such information should be based on user consent and should only be for legitimate and reasonable uses. Moreover, collected personal information should not be used or shared outside of those legitimate uses and reasonable steps should be taken to safeguard and secure access to the information.

In some implementations, users selectively block access to and/or use of personal information. Hardware or software elements can be provided to prevent or block access to such personal information. For example, a system can be configured to enable users to "opt in" or "opt out" of the collection of personal information. In another example, users can select not to provide personal information for particular purposes such as targeted content delivery.

While the present disclosure broadly covers use of personal information, the various implementations can also be implemented without the need for accessing such personal information. Various implementations are not rendered inoperable due to the lack of all or a portion of such personal information. For example, content can be selected and delivered to users by inferring preferences or settings based on non-personal information data or a bare minimum amount of personal information, such as the content being requested by the device associated with a user, other non-personal information available to the content delivery services, or publicly available information.

In some implementations, data is stored in a way that only allows the owner of the data to access the data. For example, data such as personal information may be encrypted using a public/private key system. In some other implementations, the data may be stored anonymously (e.g., without identifying personal information about the user, such as a legal name, username, time and location data, or the like). This may prevent others from being able to determine the identity of the user associated with the stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device comprising a processor:

obtaining physiological data associated with a gaze while presenting content to a user during a first period of time;

determining gaze characteristics for the first period of time based on the obtained physiological data;

determining that the user has a first attentive state during the first period of time based on classifying the gaze characteristics, wherein the first attentive state comprises a mind wandering state that includes a different stability of the gaze characteristics compared to a focused state, wherein the mind wandering state corresponds to a decrease in eye gaze stability or an increase in eye gaze velocity compared to the focused state; and in response to determining that the first attentive state differs from a second attentive state intended for the content presented during the first period of time based on exceeding a threshold, presenting feedback content for a second period of time that directs the user to modify a physiological action associated with the first attentive state.

2. The method of claim 1, wherein the second attentive state intended for the content comprises the focused state.

3. The method of claim 1, wherein presenting the feedback content for the second period of time comprises presenting guided and supportive instructions to direct the user to the second attentive state intended for the content.

4. The method of claim 1, wherein the content is a meditation experience.

5. The method of claim 4, wherein presenting the feedback content for the second period of time comprises presenting real-time feedback on a meditation performance of the user during the meditation experience.

6. The method of claim 1, wherein the feedback content is selected based on a customization experience setting associated with the user.

7. The method of claim 1, wherein the threshold associated with the mind wandering state for the first period of time is customized based on a prior experience.

8. The method of claim 1, further comprising:

identifying second content based on similarity of the second content to the content; and providing a recommendation of the second content to the user based on determining that the user has the first attentive state.

9. The method of claim 1, further comprising adjusting the content in response to determining that the first attentive state differs from a second attentive state intended for the content.

10. The method of claim 1, wherein determining the gaze characteristics for the first period of time based on the obtained physiological data comprises determining a variability of the gaze characteristic during the first period of time.

11. The method of claim 10, wherein determining the variability of the gaze characteristic during the first period of time comprises a measurement of at least one of a range, a variance, and a standard deviation of the gaze characteristic over the first period of time.

12. The method of claim 10, wherein the variability of the gaze characteristic is classified during the first period of time based on comparing the variability of the gaze characteristic to a threshold.

13. The method of claim 1, wherein the gaze characteristics comprises at least one of a direction of the gaze, a velocity of the gaze, and a gaze fixation.

14. The method of claim 1, wherein the gaze characteristics are derived from a saccade characteristic.

15. The method of claim 1, wherein the physiological data comprises an image of an eye or electrooculography (EOG) data.

16. The method of claim 1, wherein the device is a head-mounted device (HMD).

17. The method of claim 1, wherein the content is presented in an extended reality (XR) environment.

18. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining physiological data associated with a gaze while presenting content to a user during a first period of time;

determining gaze characteristics for the first period of time based on the obtained physiological data;

determining that the user has a first attentive state during the first period of time based on classifying the gaze characteristics, wherein the first attentive state comprises a mind wandering state that includes a different stability of the gaze characteristics compared to a focused state, wherein the mind wandering state corresponds to a decrease in eye gaze stability or an increase in eye gaze velocity compared to the focused state; and in response to determining that the first attentive state differs from a second attentive state intended for the content presented during the first period of time based on exceeding a threshold, presenting feedback content for a second period of time that directs the user to modify a physiological action associated with the first attentive state.

19. A non-transitory computer-readable storage medium, storing program instructions executable via one or more processors to perform operations comprising:

obtaining physiological data associated with a gaze while presenting content to a user during a first period of time;

determining gaze characteristics for the first period of time based on the obtained physiological data;

determining that the user has a first attentive state during the first period of time based on classifying the gaze characteristics, wherein the first attentive state comprises a mind wandering state that includes a different stability of the gaze characteristics compared to a focused state, wherein the mind wandering state corresponds to a decrease in eye gaze stability or an increase in eye gaze velocity compared to the focused state; and in response to determining that the first attentive state differs from a second attentive state intended for the content presented during the first period of time based on exceeding a threshold, presenting feedback content for a second period of time that directs the user to modify a physiological action associated with the first attentive state.

\* \* \* \* \*